Patented Jan. 15, 1952

2,582,534

UNITED STATES PATENT OFFICE 2,582,534

PRESERVED FISH WORM AND SOLUTION FOR AND METHOD OF PRESERVING FISH WORMS

James A. Doyle, Jr., Rome, and Gustav W. Pirk, Utica, N. Y.

No Drawing. Application November 10, 1949, Serial No. 126,684

10 Claims. (Cl. 99—3)

This invention relates to the preservation of fish worms, to compositions and methods for treating fish worms to preserve them, and to the preserved fish worm product itself.

The number of preservative compositions suggested in the prior art for the preservation of living matter of one type or another is legion. But their utilization for particular purposes has not been satisfactory. The preservation of fish worms offers unique problems. Not only must there be satisfactory preservative action to prevent or restrict satisfactorily bacterial decomposition to a minimum and other changes in the final product, but there are a number of considerations that enter into the problem that offer difficulty and it is in connection with them that prior art types of preservative compositions have not proved satisfactory. The factors referred to include maximum preservation of the color of the worm, minimum change in color from that of the natural product, the correct degree of tissue hardening, minimum shrinkage of the worm, and preservation of the "feel" of the worm. Preservative compositions should give the results referred to to the maximum extent possible and while some preservative compositions will be satisfactory if some of these objectives are obtained, the prior art materials have not been satisfactory in solving the problems of this particular art. In addition to the primary objectives referred to above, the preservative material employed should be nontoxic in the sense that it should not contain arsenicals, mercurials, fluorides, and similar or related compounds.

Among the objects of the present invention is first of all the production of preserved fish worms. Further objects include compositions and methods enabling the preservation of fish worms.

Still further objects and advantages of the present invention will appear from the more detailed description set forth below, it being understood that such more detailed description is given by way of illustration and explanation only and not by way of limitation, since various changes therein may be made by those skilled in the art without departing from the scope and spirit of the present invention.

In accordance with the present invention fish worms are produced in a preserved condition for utilization for example by fisherman or anglers in which the fish worms preserve to a maximum degree the color, tissue hardness, and "feel" of the natural worm when living together desirably with other characteristics. Some or all of these characteristics are substantially preserved to the extent necessary so that the worm can be utilized for fishing purposes in lieu of natural living worms. The worms treated in accordance with the present invention may be any types of worms employed for fishing purposes and the term fish worms will generally be used for the various types of worms that can be employed including both earth worms and sea worms although they are known by various names in different portions of the country such as angle worms, nightliners, etc., etc.

In accordance with the present invention the composition employed for preservation of fish worms includes as a fundamental constituent, formaldehyde or materials which generate formaldehyde. It has been found that formaldehyde must be present primarily for the purpose of hardening the tissues to the desired extent. However the amount of formaldehyde employed must be carefully controlled in order to produce the right degree of tissue hardening and not adversely effect the feel or tissues from this standpoint. Formaldehyde will therefore be referred to below as an essential constituent of the treating composition maintained within limited ratios or proportions as hereinafter set forth for utilization for this purpose. Other agents present will of course effect the action of the formaldehyde but in general the formaldehyde employed should be within the limit set forth. The formaldehyde as hereinafter referred to will be particularly commercial formaldehyde in the form of the aqueous solution containing from about 37 to 40% of formaldehyde by weight but of course formaldehyde in other forms and conditions may be employed including the solid polymers which generate formaldehyde when desired.

With the formaldehyde, there are employed limited amounts of modifying agents as adjuvants which have an important effect on the formaldehyde. The most important of the modifying agents to employ with the formaldehyde is one of the nonvolatile polyethylene glycols available in various forms as commercial products as for example the so called "carbowax" products, these materials being hereinafter referred to as a modifying agent or adjuvant in the form of a non-volatile polyethylene glycol. In the "carbowax" group there may particularly be mentioned "carbowax 1000" a soft waxy solid having a freezing range of from 35 to 40° C., a flash point of more than 450° F., and a viscosity in Saybolt seconds at 210° F. of 80–100; "carbowax 1500" which is an odorless, soft waxy solid slightly hygroscopic, having a specific gravity of 1.15, freezing range of from 35 to 40° C., a flash point of 430° F., and a viscosity in Saybolt seconds at 210° F. of 60–90; "carbowax 1540" which is a medium hard waxy solid having a specific gravity of 1.15, and a freezing range of from 40 to 45° C., a flash point above 450° F., and a viscosity in Saybolt seconds at 210° F. of 100–150; "carbowax 4000" a hard waxy solid having a specific gravity of 1.2, a freezing range of from 50 to 55° C., a fish point above 475° F., and a viscosity of 500–700 Saybolt seconds at 210° F.; and similar products of various types of these polyethylene glycols may be employed. The amount of such polyethylene glycol must be restricted insofar as the upper limits employed is concerned. When the amount of such polyethylene glycol exceeds about 20%, there is a resulting tissue "sloppiness" which is generally undesirable. Consequently as illustrated by the use of "carbowax 1500" the amount of such polyethylene glycol present should not exceed about 20% by weight. While reference is made to the polyethylene glycols, it is not necessary to use individual polyethylene glycols but blends of various high molecular weight polyethylene glycols may be employed including those which are commercially available under the trade names referred to above. The polyethylene glycol has a unique modifying effect particularly when employed with formaldehyde compositions of the character taught herein producing what may best be termed as a "plasticizing" effect on the tissue. Within limits of from 1 to 20% the polyethylene glycol such as "carbowax 1500" will particularly give the desired plasticizing effect in compositions as taught herein and these results obtained with such polyethylene glycols as "carbowax 1500" are unique in connection with the preservation of fish worms as taught under the present invention.

Of the adjuvants described herein, the polyethylene glycols like "carbowax 1500" give unique results of the greatest importance. However to a limited extent compositions can be produced which are satisfactory for preservation of the fish worm even though they do not contain the polyethylene glycol. Thus glycerine may be utilized in the production of compositions when the amount of glycerine is carefully restricted and in no event should exceed about 10% by weight of the composition and even above 5% frequently gives a rather "slimy" feel to the worm. The amount of glycerine in the composition will generally therefore not exceed about 1 to 5% by weight but may under some circumstances run up to 10%. However for reasons pointed out compositions containing the polyethylene glycol are preferred although compositions containing no polyethylene glycol and a small amount of glycerine are illustrated below. The glycerine may be used in combinations containing the polyethylene glycol but here again the amount should be restricted within limits indicated above so that no slimy or sloppy effect is produced.

The polyethylene glycols such as carbowax 1500 produces a more natural feel in the preserved worm than does glycerine and also gives better color retention as will be illustrated by compositions set forth below so that the polyethylene glycol is desirably and preferably employed in the compositions whether or not glycerine is present.

Another type of modifying agent or adjuvant that may be employed with the formaldehyde solution or with the compositions containing formaldehyde and polyethylene glycols as set forth above with or without glycerine, or with the formaldehyde and glycerine containing compositions without the polyethylene glycol, is one of the quaternary ammonium compounds which exhibit germicidal and bactericidal properties. As exemplary of such quaternary ammonium compounds attention may be called to the alkyl dimethylbenzyl-ammonium chlorides and related compounds. These compounds usually contain alkyl radicals of the long carbon chains above an eight carbon atom content including alkyl radicals for example from octyl to octadecyl including for example the alkyl groups present in the components of coconut oil. The alkyl groups present may be the same or may be mixtures of different alkyl groups in these various types of compounds. While the quaternary ammonium compounds exhibit desirable germicidal and bactericidal properties as is known, they lack sufficient tissue hardening characteristics to be utilized as the primary agent in the present invention and consequently are employed when used, with formaldehyde. For such purposes they may be present in concentrations of from 1:10,000 to 1:200 which is sufficient to prevent bacterial decomposition. When used alone they produce a rather sloppy effect and generally modify the natural form of the worm to a degree which is undesirable for present purposes. While the addition of alcohol confers some hardening properties, it is not sufficient for the most desirable effects. Used alone the quaternary ammonium compound appears to cause capillary rupture and consequently are employed in formulations as taught herein. Illustrative compositions are set forth below. The amount of such quaternary ammonium compound employed should generally be within the limits of from 0.1 to 1.0% by weight.

In addition to the components referred to above, other additions may be made to the compositions for particular purposes. Thus a further bactericide may be included with the compositions in any form as set forth above as illustrated by the use of a phenolic bactericide such as phenol per se. In addition to its bactericidal action, there was some apparent improvement in color of the preserved specimen so that the phenol constituent or related bactericide has an unexpected property in this direction.

The inclusion of hexamethylene tetramine also has some desirable effects when included in the composition and may be present in any of the formulations in accordance with the present invention. Not only does the "hexa" liberate formaldehyde under the conditions when employed, but it definitely prevents the development of an acid condition that may be produced for example from the tendency of formaldehyde to oxidize to formic acid. The "hexa" therefore serves in part at least as an anti-oxidant.

The active components particularly referred to above are desirably used in a vehicle which enables them to exhibit the desired properties in the preservation of fish worms in accordance with the present invention. Such vehicle will generally include one of the lower alkyl alcohols particularly the liquid alcohols and more specifically methyl alcohol, ethyl alcohol, and isopropyl alcohol. Any of these alcohols may be employed although methyl alcohol appears to bring about less color loss than do the others and is desirably employed. The amount of alcohol present may be such as to confer anti-freezing properties on the solution. In general for this purpose there should be at least 35% alcohol which amount may be increased as the temperature of exposure drops. However it is not essential for the preservation properties of the present invention that the alcohol exceed 35% although the higher amounts may be employed. While preservation may be more perfectly achieved and with fewer complications resulting when water is entirely absent from the composition, as a general rule complete dehydration results in excessive tissue shrinkage so that some water should generally be present in the composition. And if desired water can constitute the only vehicle present or the alcohol may constitute the only vehicle present but more desirably mixtures of water and alcohol may be employed.

An additional component which may be employed includes a wetting agent or surface active agent. These may be of any particular type but more particularly include the anionic types of wetting agents as for example the "tergitols" which are higher sodium alkyl sulfates, the "aerosols" particularly "aerosol O. T." which are the alkyl derivatives of sulfosuccinates such as more particularly dioctyl sodium sulfosuccinate, and materials of the character of "Aqua Rex D" as for example the sodium salts of the sulfate mono esters of the higher fatty alcohols particularly lauryl and myristyl derivatives. The amount of wetting agent present should generally be restricted to not more than 1% and may usually be from 0.1% to 1.0% the amount of 0.25% by weight being generally adequate. It should be kept in mind that polyethylene glycols of the character of "carbowax 1500" and the alcohol themselves may contribute in some degree at least to a reduction in surface tension. The wetting agents should be employed within restricted amounts for the best purposes since they greatly accelerate the speed of killing of any solution to which they are added. Some of them like the "tergitols" may produce some cloudiness particularly with increasing concentration. Others like "Aqua Rex D" while giving a clear solution, may tend to increase or intensify color loss or bleaching. The "aerosols" such as "aerosol O. T." give the clearest solution but again there may be more color lost than is deemed desirable. While color may be improved by omission of wetting agent, and they do not have to be employed in accordance with the present invention, the speed of killing is materially less on the omission of these wetting agents.

Considering the various features discussed above, compositions produced in accordance with the present invention with all of the components stated above present should include limits as follows:

|  | Per cent |
|---|---|
| Formaldehyde | 3–25 |
| Alcohol | Up to 100 |
| Water | 40–0 |
| Phenol (or other bactericide) | 0.1–1.0 |
| Hexamethylenetatramine | 1–10 |
| Carbowax | 1–20 |
| Glycerine | 0.1–10 |

To illustrate particular forms of the invention that may be desirably employed a number of compositions are given below. They are not all equally effective in the preservation of the fish worms since some are much more desirably employed than others. But they will illustrate formulations that can be utilized where one or more of the desired objectives are produced. The proportions are all by weight unless otherwise indicated.

A most desirably employed composition which produces all of the objectives sought is the following:

I

|  | Per cent |
|---|---|
| Carbowax 1500 | 10.32 |
| Formaldehyde | 7.22 |
| Hexamethylenetetramine | 6.19 |
| Phenol (U. S. P. crystals) | 0.618 |
| Methyl alcohol (absolute) | 41.27 |
| Water | 34.38 |
| Odor to suit. | |

This composition gives excellent results in the preservation of the worm retaining the color and feel with practically no shrinkage. It will also withstand low temperatures against freezing.

A number of compositions are further given below to illustrate various phases of the types of materials that can be employed although as indicated above they will not produce results equivalent to the preferred types of materials particularly as illustrated above.

II

|  | Per cent |
|---|---|
| Carbowax 1500 | 8.07 |
| Formaldehyde | 8.07 |
| Hexamethylene tetramine | 5.76 |
| Sodium chloride | 0.615 |
| Phenol | 0.615 |
| Water | 76.86 |

The composition gives color and "feel" which are well preserved but there is some tendency towards shriveling, to an extent which is more than desirable. The preserved worms using this formula have actually been used successfully in fishing.

III

|  | Per cent |
|---|---|
| Carbowax 1500 | 2.5 |
| Formaldehyde | 6.0 |
| Hexamethylenetetramine | 6.0 |
| Water | 85.5 |

The composition is an excellent one in giving the result sought in that good color and feel are preserved but its effects are not quite as satisfactory as those of the preferred first named composition specifically given above.

IV

|  | Per cent |
|---|---|
| Carbowax 1500 | 2.5 |
| Formaldehyde | 6.0 |
| Hexamethylenetetramine | 6.0 |
| Methyl alcohol (absolute) | 20.0 |
| Water | 65.5 |

This composition gives good color but the feel is not quite as good as desired.

V

|  | Per cent |
|---|---|
| Carbowax 1500 | 3.14 |
| Formaldehyde | 6.3 |
| Aerosol O. T. (100%) | 0.5 |
| Methyl alcohol (absolute) | 42.3 |
| Hexamethylenetetramine | 6.3 |
| Water | 42.3 |

VI

|  | Per cent |
|---|---|
| Carbowax 1500 | 2.5 |
| Formaldehyde | 3.9 |
| Aerosol O. T. (100%) | 0.5 |
| Methyl alcohol (absolute) | 11.3 |
| Water | 81.8 |

VII

| | Per cent |
|---|---|
| Formaldehyde | 12.5 |
| Ethyl alcohol (70%) | 25 |
| Water | 62.5 |

This composition illustrates compositions that do not contain adjuvants although the percent of formaldehyde is limited within that given above and an alcohol and water vehicle is employed. The composition does not give as desirable results particularly because there is too much color lost, and somewhat of a harsh feel is given to the worms which also have a tendency to curl.

VIII

| | Per cent |
|---|---|
| Ethyl alcohol (70%) | 32.3 |
| Glycerine C. P. | 0.16 |
| Formaldehyde | 12.9 |
| Water | 54.6 |

A composition of this character does not give as desirable results as are usually sought with respect to color, tissue and feel. It is however far superior to that produced when the glycerine is omitted.

Compositions to illustrate the difference in effect between the utilization of a polyethylene glycol as compared with glycerine are given immediately below:

IX

| | A | B |
|---|---|---|
| | Per cent | Per cent |
| Methyl alcohol (absolute) | 11.6 | 11.6 |
| Carbowax 1500 | 1.64 | |
| Glycerine C. P. | | 1.62 |
| Tergitol "7" | 0.5 | 0.5 |
| Formaldehyde | 9.9 | 9.9 |
| Water | 76.0 | 76.0 |

A composition containing the polyethylene glycol (carbowax 1500) produces a somewhat more natural feel than glycerine and has better color retention but the compositions may both be employed. Beyond a concentration of 20% polyethylene glycol there is too great a softening effect on the tissues and when increased to 30% quite a "sloppy" effect so that it is undesirably employed in concentrations that high.

To illustrate compositions that may be employed where quaternary compounds are present the following may be considered:

X

| | |
|---|---|
| Quaternary comp. (H₂O sol.) | 1:200 |
| Ethyl alcohol (70%) per cent | 61.7 |
| Formaldehyde do | 3.5 |

This composition gives fairly good hardening but somewhat too much bleaching and a much more satisfactory effect particularly with respect to color is obtained with the following composition which also produces satisfactory feel and tissue hardening:

XI

| | |
|---|---|
| Quaternary comp. (H₂O sol.) | 1:200 |
| Methyl alcohol (absolute) per cent | 64. |
| Carbowax 1500 do | 2.6 |
| Formaldehyde do | 6.4 |

The quaternary compound employed above was an alkyl dimethyl-benzyl ammonium chloride in which the alkyl radicals correspond with those contained in the fatty acids of coconut oil running from octyl to octadecyl and illustrates various types of the quaternary ammonium compounds that may be utilized.

The quaternary component in each example was a 1:200 aqueous solution constituting the balance of composition in examples X and XI but the quaternary component may be added to any of the compositions.

Having thus set forth our invention, we claim:

1. As a composition for preserving fish worms, from about 3 to 25% formaldehyde, a modifying agent selected from the group consisting of about 1 to 20% of a non-volatile polyethylene glycol, of about 0.1 to 10% of glycerine, and of about 0.1 to 1.0% of a quaternary ammonium compound, the percentages being by weight, and a vehicle therefore selected from the group consisting of water, a liquid alkyl alcohol and mixtures thereof.

2. As a composition for preserving fish worms, from about 3 to 25% formaldehyde and from about 1 to 20% of a non-volatile polyethylene glycol, the percentages being by weight, and a vehicle therefore selected from the group consisting of water, a liquid alkyl alcohol and mixtures thereof.

3. As a composition for preserving fish worms, from about 3 to 25% formaldehyde, and from about 0.1 to 10% of glycerine, the percentages being by weight, and a vehicle therefore selected from the group consisting of water, a liquid alkyl alcohol and mixtures thereof.

4. As a composition for preserving fish worms, from about 3 to 25% formaldehyde and from about 0.1 to 1.0% of a quaternary ammonium compound, the percentages being by weight, and a vehicle therefore selected from the group consisting of water, a liquid alkyl alcohol and mixtures thereof.

5. A composition as set forth in claim 1 containing from about 1 to 10% by weight of hexamethylenetetramine.

6. A composition as set forth in claim 1 containing from about 0.1 to 1.0% by weight of a phenolic bactericide.

7. A composition as set forth in claim 1 in which the polyethylene glycol is a soft waxy solid of sp. gr. 1.15, freezing range 35 to 40° C., flash point of 30° F., and a viscosity in Saybolt seconds at 210° F. of 60–90.

8. A composition as set forth in claim 1 containing from about 0.1 to 1.0% of a wetting agent.

9. A fish worm immersed and retained in a preserving composition containing 3 to 25% formaldehyde, a modifying agent selected from the group consisting of about 1 to 20% of a non-volatile polyethylene glycol, of about 0.1 to 10% of glycerine, and of about 0.1 to 1.0% of a quaternary ammonium compound, the percentages being by weight, and a vehicle therefore selected from the group consisting of water, a liquid alkyl alcohol and mixtures thereof, the preserved fish worm having substantially the color, tissue hardness, and "feel" of the natural fish worm when living.

10. The method of preserving fish worms which comprises immersing and retaining the worm in a composition containing from about 3 to 25% formaldehyde, a modifying agent selected from the group consisting of about 1 to 20% of a non-volatile polyethylene glycol, of about 0.1 to 10% of glycerine, and of about 0.1 to 1.0% of a quaternary ammonium compound, the percentages being by weight, and a vehicle therefore selected from the group consisting of water, a liquid alkyl alcohol and mixtures thereof.

JAMES A. DOYLE, JR.
GUSTAV W. PIRK.

REFERENCES CITED

The following references are of record in the file of this patent:

UNITED STATES PATENTS

| Number | Name | Date |
|---|---|---|
| 1,746,714 | Picht | Feb. 11, 1930 |
| 2,054,565 | Stovall | Sept. 15, 1936 |
| 2,102,052 | Yearley | Dec. 14, 1947 |
| 2,452,552 | Curtis | Nov. 2, 1948 |

OTHER REFERENCES

Baits, Bureau of Fisheries, Washington, D. C. 1935, page 4.